United States Patent
Hinzte-Brüning et al.

[11] Patent Number: 5,817,370
[45] Date of Patent: *Oct. 6, 1998

[54] WATER-DILUTABLE BINDERS, AQUEOUS COATING MATERIALS CONTAINING THESE BINDERS, AND PROCESSES FOR THE PRIMING OR ONE-LAYER COATING OF PLASTICS

[75] Inventors: Horst Hinzte-Brüning; Harald Borgholte; Hans-Josef Oslowski, all of Münster; Albin Berger, Bobenheim am Berg; Michael-Wolfgang Müller, Biblis, all of Germany

[73] Assignee: BASF Lacke + Farben, AG, Muenster-Hiltrup, Germany

[*] Notice: This patent issued on a continued prosecution application filed under 37 CFR 1.53(d), and is subject to the twenty year patent term provisions of 35 U.S.C. 154(a)(2).

[21] Appl. No.: 762,480

[22] Filed: Dec. 9, 1996

Related U.S. Application Data

[63] Continuation of Ser. No. 737,066, Oct. 9, 1996, abandoned.

[51] Int. Cl.$^6$ ......................................................... B05D 1/36
[52] U.S. Cl. ...................... 427/412.3; 427/393.5; 524/458; 524/461; 524/522; 524/536; 526/201
[58] Field of Search ...................... 524/461, 536, 524/458, 522; 526/201; 427/393.5, 412.3

[56] References Cited

U.S. PATENT DOCUMENTS

| | | | |
|---|---|---|---|
| 3,962,157 | 6/1976 | Nakano et al. | 524/461 X |
| 4,087,393 | 5/1978 | Tsubuko et al. | 524/461 X |
| 4,622,358 | 11/1986 | Pennewiss et al. | 524/458 |
| 4,857,577 | 8/1989 | Buter | 524/458 |
| 4,861,811 | 8/1989 | Yasuda | 524/458 |
| 5,173,523 | 12/1992 | Auchter et al. | 524/461 |
| 5,310,810 | 5/1994 | Natoli et al. | 524/458 |
| 5,349,022 | 9/1994 | Ashihara et al. | 524/458 |
| 5,389,440 | 2/1995 | Arpin et al. | 524/458 |
| 5,434,213 | 7/1995 | Chen et al. | 524/536 X |
| 5,446,083 | 8/1995 | Stevens et al. | 524/458 |
| 5,637,409 | 6/1997 | Stevens et al. | 524/458 |

FOREIGN PATENT DOCUMENTS

| | | | |
|---|---|---|---|
| 0 369 604 | 10/1989 | European Pat. Off. | |
| 2617819 | 11/1976 | Germany | 524/461 |
| 106903 | 8/1981 | Japan | 524/461 |
| 1222548 | 2/1971 | United Kingdom | 524/461 |

OTHER PUBLICATIONS

Derwent, Water–Absorbable resin dispersion with improved paintability by Polymerising monomer in solvent, 1994, 1 pge.

Derwent, Adhesive resin compn, for polyolefin, 1994 1 pge. 92–353554 and 93–088696.

*Primary Examiner*—Judy M. Reddick

[57] ABSTRACT

Water dilutable binders, prepared by subjecting to free radical polymerization (A) from 20 to 90% by weight of a mixture of
  (a1) from 3 to 50% by weight of acrylic acid, methacrylic acid or a mixture of acrylic acid and methacrylic acid, and
  (a2) from 50 to 97% by weight of an ethylenically unsaturated monomer or a mixture of ethylenically unsaturated monomers, in the presence of (B) from 9.9 to 79.9% by weight of a halogen-free polyolefin free from maleic anhydride groups, or a mixture of halogen-free polyolefins free from maleic anhydride groups, and (C) from 0.1 to 10% by weight of a free radical initiator or a mixture of free radical initiators and, after neutralization of at least 20% of the carboxyl groups contained in the resulting polymerization product, dispersing the polymerization product in water, the sum of the percentages by weight of components (A), (B) and (C) and (a1) and (a2) in each case always being 100% by weight.

10 Claims, No Drawings

WATER-DILUTABLE BINDERS, AQUEOUS COATING MATERIALS CONTAINING THESE BINDERS, AND PROCESSES FOR THE PRIMING OR ONE-LAYER COATING OF PLASTICS

This application is a continuation of U.S. Ser. No. 08/737,066, filed on Oct. 9, 1996, and now abandoned.

The invention relates to water-dilutable binders, to aqueous coating materials containing these binders and to processes for the priming or single-layer coating of plastics.

When coating plastics, in order to achieve satisfactory adhesion of the applied coat or of the applied coats it is necessary to pretreat the plastic surface, for example, by flame treatment, corona treatment, plasma treatment or by etching with chromosulfuric acid and/or priming with special coating materials.

Pretreatment methods such as flame treatment, corona treatment, plasma treatment or etching with chromosulfuric acid are associated with technical effort and expense and/or should be avoided for reasons of ecology.

To prime plastics based on polypropylene, it is usual to employ coating materials which have the disadvantage that they include halogen-containing binders (cf. for example JP-A-256 556/1989).

EP-A-468 644 describes coating materials which are said to be also suitable for the priming of plastics. The preparation of the binders employed in these coating materials, however, requires monomers which can be obtained only with difficulty.

The object of the present invention is to provide water-dilutable binders and aqueous coating materials which contain these binders and which can be employed in processes for the priming or single-layer coating of plastics.

This object is surprisingly achieved by the provision of water-dilutable binders which are characterized in that they can be prepared by subjecting (A) from 20 to 90% by weight, preferably from 55 to 85% by weight, of a mixture of
  (a1) from 3 to 50% by weight, preferably from 5 to 15% by weight, of acrylic acid, methacrylic acid or a mixture of acrylic acid and methacrylic acid, and
  (a2) from 50 to 97% by weight, preferably from 85 to 95% by weight, of an ethylenically unsaturated monomer or a mixture of ethylenically unsaturated monomers, in the presence of (B) from 9.9 to 79.9% by weight, preferably from 15 to 45% by weight, of a halogen-free polyolefin or a mixture of halogen-free polyolefins, and (C) from 0.1 to 10% by weight, preferably from 1 to 7% by weight, of a free radical initiator or a mixture of free radical initiators to free-radical polymerization and, after neutralization of at least 20% of the carboxyl groups contained in the resulting polymerization product, dispersing the polymerization product in water, the sum of the percentages by weight of components (A), (B) and (C) and (a1) and (a2) in each case always being 100% by weight and the composition of the mixture of (a1) and (a2) being selected such that a polymer resulting from the polymerization of the mixture of (a1) and (a2) alone —has a glass transition temperature of from 0° to 150° C., preferably from 10° to 80° C.,
—contains from 0.04 to 1.0, preferably from 0.1 to 0.5, milliequivalents of one or more of the following functional groups: —COOH, —OH, —NR$_3$, —CN, —CONH$_2$, —CO—, —NHCONH—, —OCONH—, —OPO$_3$H, —OSO$_3$H and —R—O—R—, preferably —COOH, —CN, —CNH$_2$ and —R—O—R, where R is an organic radical, preferably an alkyl or alkylene radical having 1 to 6 carbon atoms, and
—consists to the extent of from 0 to 50% by weight, preferably from 5 to 25% by weight, of one or more of the following cycloaliphatic groups which may be substituted by at least one alkyl group containing from 1 to 12, preferably from 1 to 6, carbon atoms: cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl and bicyclododecyl group, preferably cyclohexyl and isobornyl group.

Aqueous coating materials containing these binders can be employed in processes for the priming or single-layer coating of plastics, especially plastics based on polypropylene and/or copolymers of propylene and copolymerizable monomers such as, for example, ethylene, and are distinguished in that they give coated layers which adhere very well to pretreated and nonpretreated plastics substrates.

The mixture (A) which is employed for preparing the water-dilutable binders according to the invention comprises
  (a1) from 3 to 50% by weight, preferably from 5 to 15% by weight, of acrylic acid, methacrylic acid or a mixture of acrylic acid and methacrylic acid, and
  (a2) from 50 to 97% by weight, preferably from 85 to 95% by weight, of an ethylenically unsaturated monomer or a mixture of ethylenically unsaturated monomers, the sum of the percentages by weight of components (a1) and (a2) always being 100% by weight and the composition of the mixture of (a1) and (a2) being selected such that a polymer resulting from the polymerization of the mixture of (a1) and (a2) alone —has a glass transition temperature of from 0° to 150° C., preferably from 10° to 80° C.,
—contains from 0.04 to 1.0, preferably from 0.1 to 0.5, milliequivalents of one or more of the following functional groups: —COOH, —OH, —NR$_3$, —CN, —CONH$_2$, —CO—, —NHCONH—, —OCONH—, —OPO$_3$H, —OSO$_3$H and —R—O—R—, preferably —COOH, —CN, —CNH$_2$ and —R—O—R, where R is an organic radical, preferably an alkyl or alkylene radical having 1 to 6 carbon atoms, and
—consists to the extent of from 0 to 50% by weight, preferably from 5 to 25% by weight, of one or more of the following cycloaliphatic groups which may be substituted by at least one alkyl group containing from 1 to 12, preferably from 1 to 6, carbon atoms: cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl and bicyclododecyl group, preferably cyclohexyl and isobornyl group.

Since the glass transition temperatures of polymers prepared from ethylenically unsaturated monomers can be calculated according to the equation $$1/T_g = \Sigma W_n / T_{gn}$$

$T_g$ = Glass transition temperature of the copolymer in °K.
$W_n$ = Proportion by weight of the nth monomer
$T_{gn}$ [sic] = Glass transition temperature of the homopolymer of the nth monomer, and since ethylenically unsaturated monomers which contain COOH, —OH, —NR$_3$, —CN, —CONH$_2$, —CO—, —NHCONH—, —OCONH—, —OPO$_3$H, —OSO$_3$H, —R—O—R— (where R is an organic radical, preferably an alkyl or alkylene radical having 1 to 6 carbon atoms), cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl or bicyclododecyl groups are commercially available, the person skilled in the art is able without difficulty to select the composition of the mixture of components (a1) and (a2) such that a polymer resulting from the polymerization of the mixture of (a1) and (a2) alone —has a glass transition temperature of from 0° to 150° C., preferably from 10° to 80° C., —contains from 0.04 to 1.0, preferably from 0.1 to 0.5, milliequivalents of one or more of the following functional groups: —COOH, —OH, —NR$_3$, —CN, —CONH$_2$, —CO—, —NHCONH—, —OCONH—, —OPO$_3$H, —OSO$_3$H and —R—O—R—, preferably —COOH, —CN, —CNH$_2$ and —R—O—R, where R is an organic radical, preferably an alkyl or alkylene radical having 1 to 6 carbon atoms, and —consists to the extent of from 0 to 50% by weight, preferably from 5 to 25% by weight, of one or more of the following cycloaliphatic groups which may be substituted by at least one alkyl group containing from 1 to 12, preferably from 1 to 6, carbon atoms: cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl and bicyclododecyl group, preferably cyclohexyl and isobornyl group.

Taking into account the selection criteria described above, possible examples for use as component (a2) are: esters of acrylic or methacrylic acid, especially aliphatic and cycloaliphatic acrylates or methacrylates having up to 20 carbon atoms in the alcohol residue, for example methyl, ethyl, propyl, butyl, hexyl, ethylhexyl, stearyl, lauryl, isobornyl, cyclohexyl and tert-butylcyclohexyl acrylate or methacrylate, hydroxyalkyl esters of acrylic acid, methacrylic acid or of another $\alpha,\beta$-ethylenically unsaturated carboxylic acid, for example 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate or 4-hydroxybutyl methacrylate, corresponding esters of other ethylenically unsaturated acids having up to 6 carbon atoms in the molecule, for example ethacrylic acid and crotonic acid, acrylamidomethylpropanesulfonic acid, aromatic vinyl hydrocarbons, for example styrene, $\alpha$-alkylstyrene and vinyltoluene, monomers containing amide groups, for example acrylamide, methacrylamide, N-methylolacrylamide and N-methylolmethacrylamide, and monomers containing nitrile groups, for example acrylonitrile and methacrylonitrile, or mixtures of the monomers mentioned.

As component (B) a halogen-free polyolefin is employed, preferably a homopolymer of propylene or a copolymer of propylene and at least one comonomer, for example ethylene, butylene or isoprene, or a mixture of such polyolefins. It is particularly preferred to employ a homopolymer of propylene having a weight-average molecular weight of from 1000 to 100,000, preferably from 5000 to 50,000 (determined by gel permeation chromatography using a polypropylene standard) and an iodine number of up to 0.3 mg of I$_2$/g, preferably from 0.005 to 0.05 mg of I$_2$/g, or a copolymer of propylene and ethylene which consists of not more than 20% by weight of ethylene units, has a number-average molecular weight of from 1000 to 100,000, preferably from 5000 to 50,000 (determined by gel permeation chromatography using a polypropylene standard) and an iodine number of up to 0.3 mg of I$_2$/g, preferably from 0.005 to 0.05 mg of I$_2$/g, or a mixture of these polymers as component (B). The polypropylene homopolymers employed should preferably be isotactic. The polyolefins employed as component (B) may have been subjected to a grafting reaction with maleic anhydride, although the polyolefins employed are preferably free from maleic anhydride groups. Halogen-free polyolefins of the type described above are commercially available, for example, from the companies BASF AG, EASTMAN, ELF-ATOCHEM and SANYO.

In order to prepare the water-dilutable binders according to the invention, from 20 to 90% by weight, preferably from 55 to 85% by weight, of the mixture (A) is subjected to free-radical polymerization in the presence of from 9.9 to 79.9% by weight, preferably from 15 to 45% by weight, of component (B) and from 0.1 to 10% by weight, preferably from 1 to 7% by weight, of component (C) and, after neutralization of at least 20% of the carboxyl groups contained in the resulting polymerization product, the polymerization product is dispersed in water. The sum of the percentages by weight of components (A), (B) and (C) is always 100% by weight.

The polymerization of the mixture (A) in the presence of components (B) and (C) may be carried out in bulk, in aqueous emulsion or in an organic solvent or a mixture of organic solvents. The polymerization is preferably carried out in an organic solvent or a mixture of organic solvents, in particular in apolar solvents having a boiling range of between 120° and 200° C., preferably from 135° to 190° C., at polymerization temperatures of from 120° to 200° C., preferably from 130° to 160° C.

As component (C) it is possible in principle to employ all known free-radical initiators. The free-radical initiators preferably employed are those which have a half-life at the polymerization temperature of between 15 and 180 minutes. Examples of free-radical initiators which can be employed are: dialkyl peroxides, for example dicumyl peroxide and di-tert-butyl peroxide, peroxy esters, for example tert-butyl peroxybenzoate, tert-butyl peroxyoctanoate, tert-butyl peroxyacetate and tert-butyl peroxyisobutyrate, diacyl peroxides, for example benzoyl peroxide and acetyl peroxide, and azo compounds, for example azobis (isobutyronitrile).

To neutralize the polymerization product it is preferred to employ organic amines, especially tertiary amines such as, for example, dimethylethanolamine.

Using the binders according to the invention it is possible, by methods which are well known to the person skilled in the art, to prepare aqueous coating materials which can be employed for the priming or single-layer coating of plastics, especially plastics based on polypropylene and/or copolymers of propylene and copolymerizable monomers such as ethylene, and which can be used to prepare coating layers which adhere very well to pretreated and nonpretreated plastics substrates. The binders according to the invention can also be employed in basecoats for the production of multicoat finishes of the "basecoat/clearcoat" type.

The aqueous coating materials which are prepared using binders according to the invention may also contain, in addition to the binders according to the invention, other compatible synthetic resins, for example polyacrylate resins, polyester resins and polyurethane resins (cf. for example DE-A-42 39 695) and crosslinking agents such as, for example, amino resins and/or optionally blocked polyisocyanates. If nonblocked polyisocyanates are employed, it is generally advantageous to store the aqueous coating materials as a two-component system.

The aqueous coating materials prepared using the binders according to the invention can be formulated either with or without pigments and/or fillers. They can also be applied in very thin layer thicknesses (from 5 to 10 $\mu$m).

The aqueous coating materials prepared using the binders according to the invention generally contain, in their ready-for-application form, from 30 to 80% by weight, preferably from 45 to 70% by weight, of water, from 0 to 50% by weight, preferably from 0 to 10% by weight, of organic solvents, from 6 to 70% by weight, preferably from 15 to 45% by weight, of the binder according to the invention, from 0 to 40% by weight, preferably from 0 to 25% by weight, of pigments and/or fillers, and from 0 to 10% by weight of other additives, for example catalysts, thickeners, leveling agents etc., the percentages by weight being based on the overall formulation of the coating materials in the ready-for-application form (i.e. e.g. at spray viscosity).

Using the aqueous coating materials prepared with the binders according to the invention, it is possible to prime plastics such as, for example, ABS, AMMA, ASA, CA, CAB, EP, UF, CF, MF, MPF, PF, PAN, PA, PC, PE, HDPE, LDPE, PETP, PMMA, PP, PS, SB, PUR, PVC, RF, SAN, PP-EPDM and UP (abbreviations according to DIN 7728T1), preferably polyolefins such as polypropylene and polypropylene-EPDM, or to coat them in a single layer. The plastics to be coated may of course also be polymer blends, modified plastics or fiber-reinforced plastics. The plastics primed with the aqueous coating materials according to this invention may be coated over using, for example, one-coat solid-color or metallic finishes or two-coat solid-color or metallic finishes of the basecoat/clearcoat type, without problems.

In the text below the invention is illustrated in more detail with reference to embodiment examples. In these examples all parts are parts by weight unless expressly stated otherwise.

1. Preparation of an aqueous dispersion of a binder according to the invention 150.0 parts of a mixture of aromatic solvents having a boiling range of from 165° C. to 185° C. (SHELLSOL® A) and 150.0 parts of a random copolymer of propylene and ethylene having a melting point of 134° C. (ASTM D 3418), a dropping point according to Ubbelohde of 155° C. (DIN 51801), a viscosity of 1600 mm$^2$/s (190° C., DIN 51562) and a weight-average molecular weight of 37,000 g/mol and an iodine number of 0.015 mg of I$_2$/g are weighed out into a polymerization vessel made of stainless steel and fitted with stirrer, reflux condenser, a monomer feed and an initiator feed, and are heated to 145° C. The mixture is stirred at this temperature until it is homogeneous. Subsequently, a mixture of 36.0 parts of di-tertiary-butyl peroxide and 46.5 parts of SHELLSOL® A is added dropwise to the homogeneous mixture over the course of 3 hours and 45 minutes, at a constant rate, the temperature in the reaction mixture being held at 144°–146° C. 15 minutes after the commencement of the addition of the di-tertiary-butyl peroxide solution, a mixture of 160.8 parts of butyl methacrylate, 169.2 parts of methyl methacrylate, 115.8 parts of ethylhexyl acrylate, 115.8 parts of cyclohexyl methacrylate and 38.4 parts of acrylic acid is added over the course of 3 hours. After the end of the initiator feed, polymerization is continued for 2 hours more. Then enough solvent is distilled off to give a resin solution having a content of nonvolatile constituents of 95% by weight. This solution is subsequently diluted with butyl acetate 98/100 to a content of nonvolatile constituents of 50% by weight and is cooled to 110° C. 44.9 parts of dimethylethanolamine are then added to this solution, and the mixture is stirred for 30 minutes. Subsequently, 1834.0 parts of deionized water are added at 80° C. with stirring. Finally, the organic solvents are distilled off from the resulting aqueous dispersion until a residual solvent content of below 5% by weight has been reached. The aqueous dispersion obtained in this way has a content of nonvolatile components of 30% by weight (1 h/130° C.), an acid number of 40 and a pH of 8.2.

2. Use of the aqueous dispersion prepared according to 1. for priming substrates of PP/EPDM The aqueous binder dispersion prepared according to 1. is diluted with deionized water to a viscosity of 25 sec (DIN 4 cup) and applied at 23° C. and 60% relative atmospheric humidity, using a spray pressure of 4–5 bar, to a PP/EPDM test panel (KELTAN TP 0550, DSM) which has been wiped beforehand with a paper cloth impregnated with isopropanol so as to result in a dry film thickness of 5 $\mu$m. The film is aerated at 23° C. for 30 min. A solvent-containing metallic basecoat is then applied under the abovementioned conditions at a dry film thickness of 15 $\mu$m. After an aeration time at 23° C. of 5 min, a solvent-containing two-component clearcoat is applied under the abovementioned conditions at a dry film thickness of 40 $\mu$m. After an aeration time at 23° C. of 15 minutes, the entire coating is baked at an oven temperature of 120° C. for 45 minutes. After storage at 50° C. for 12 hours, the following tests are carried out:

1. Crosshatch in accordance with DIN 53151 followed by adhesive-tape tear-off

0=none of the area torn off, 6 (=100% of the area torn off, even beyond the crosshatch squares).

2. Torsional adhesion measurement with the Twist-o-Meter (Epprecht Instruments & Controls AG, Dottikon, Switzerland)

For this test the coating system is sanded with fine sandpaper (coarseness P400). Then five alminum [sic] dies are stuck onto the roughened surface using a two-component adhesive (ARALDIT AW 2101/ ARALDIT HW 2951=1:0.75). After 48 h at 23° C. and 50% relative atmospheric humidity, the dies are twisted off at a rate of 1 rotation/minute. The force required to twist off the coating film below the die area is indicated in N/mm$^2$.

3. Wet stress

A coated panel is immersed for two hours in deionized water which is in motion and has a temperature of 70° C. After one hour of regeneration at 23° C., the adhesion according to DIN 53151 with subsequent adhesive-tape tear-off is determined and the alteration of the coated surface is assessed visually.

For comparison, the substrate described above is primed, after being cleaned as described above, with the aqueous coating material described in Example 1 of DE-A-42 39 695. The panels thus primed are dried at an oven temperature of 80° C. for 30 minutes and then are coated over as described above. The testing of the resulting coatings is carried out as described above.

The results of the tests are summarized in the following Table:

|  | Example (according to the invention) | Comparison |
|---|---|---|
| Crosshatch | 0–1 | 6 |
| Torsional adhesion measurement [N/mm$^2$] | 8.5 | <=0* |
| Crosshatch after hot-water test (2 h, 70° C.) | 1–2 | not determined owing to insufficient initial adhesion |

*: film delamination occurs even while the sample is being prepared

What is claimed is:

1. Water dilutable binders, prepared by subjecting to free radical polymerization (A) from 20 to 90% by weight of a mixture of
 (a1) from 3 to 50% by weight of acrylic acid, methacrylic acid or a mixture of acrylic acid and methacrylic acid, and
 (a2) from 50 to 97% by weight of an ethylenically unsaturated monomer or a mixture of ethylenically unsaturated monomers, in the presence of (B) from 9.9 to 79.9% by weight of a halogen-free homopolymer or copolymer of polypropylene free from maleic anhydride groups, or a mixture of halogen-free polyolefins free from maleic anhydride groups, and (C) from 0.1 to 10% by weight of a free radical initiator or a mixture of free radical initiators and, after neutralization of at least 20% of the carboxyl groups contained in the resulting polymerization product, dispersing the polymerization product in water, the sum of the percentages by weight of components (A), (B) and (C) and (a1) and (a2) in each case always being 100% by weight and the composition of the mixture of (a1) and (a2) being selected such that a polymer resulting from the polymerization of the mixture of (a1) and (a2) alone —has a glass transition temperature of from 0° to 150° C.,
—contains from 0.04 to 1.0 milliequivalents of one or more of the following functional groups: —COOH, —OH, —NR$_3$, —CN, —CONH$_2$, —CO—, —NHCONH—, —OCONH—, —PO$_3$H, —OSO$_3$H and —R—O—R— (where R is an organic radical), and —comprises from 0 to 50% by weight of one or more cycloaliphatic groups which may be substituted by at least one alkyl group containing from 1 to 12 carbon atoms, wherein the cycloaliphatic groups are selected from the group consisting of cyclopentyl, cyclohexyl, perhydronaphthyl, perhydroanthracyl, perhydrophenanthryl, adamantyl, isobornyl, bicyclohexyl, bicycloheptyl, bicyclooctyl, bicyclononyl, bicyclodecyl, bicycloundecyl and bicyclododecyl groups and mixtures thereof.

2. Water-dilutable binders according to claim 1, wherein component (A) is employed in a quantity of from 55 to 85% by weight.

3. Water-dilutable binders according to claim 1 wherein component (a1) is employed in a quantity of from 5 to 15% by weight.

4. Water-dilutable binders according to claim 1 wherein component (a2) is employed in a quantity of from 85 to 95% by weight.

5. Water-dilutable binders according to claim 1 wherein component (B) is employed in a quantity of from 15 to 45% by weight.

6. Water-dilutable binders according to claim 1 wherein component (C) is employed in a quantity of from 1 to 7% by weight.

7. Water-dilutable binders according to claim 1 wherein the mixture of (a1) and (a2) is selected such that a polymer resulting from the polymerization of the mixture of (a1) and (a2) alone —has a glass transition temperature of from 10° to 80° C.,
—contains from 0.1 to 0.5 milliequivalents of one or more of the following functional groups: —COOH, —CN, —CNH$_2$ and —R—O—R—, and
—comprises from 5 to 25% by weight of cyclohexyl groups or isobornyl groups or a mixture of these groups.

8. Aqueous coating materials, comprising at least one water-dilutable binder according to claim 1.

9. Process for the priming or single-layer coating of substrates made of plastic, comprising applying an aqueous coating material according to claim 1 to a plastic substrate.

10. Process according to claim 9, wherein the plastic substrate is made of polypropylene.

* * * * *